United States Patent Office 3,549,563
Patented Dec. 22, 1970

3,549,563
POLYOLEFIN FOAM RETARDER
George R. Hill and Donald G. Needham, Bartlesville, Okla., assignors to Phillips Petroleum Company, a corporation of Delaware
No Drawing. Filed June 5, 1967, Ser. No. 643,355
Int. Cl. C08f 29/04, 45/58, 47/10
U.S. Cl. 260—2.5
11 Claims

ABSTRACT OF THE DISCLOSURE

A thiobis-cresol in concentrations within the range of about 0.03 to 0.5 weight percent in conventional low density polyethylene foam recipes functions as a retarder in the foaming process, permitting higher stock temperatures to be used.

---

This invention relates to foamable compositions. In one aspect, it relates to a method of incorporating a foam retarder into the foamable composition to inhibit premature decomposition of the foaming agent so that the optimum resin temperature can be employed. In another aspect, it relates to a composition suitable for wire coating.

Foam retarders are used to inhibit premature decomposition of foaming agents so that optimum resin temperatures can be used. Foam extrusion compositions are constantly being studied as the blends must be tailor made for specific applications and in order to produce blends having the desired processing properties. Compositions are constantly being sought where the degree of retardation is related to the concentration level of the retarder that where the resulting blend has desired processing properties thereby simplifying determination necessary for the addition of the retarder to obtain the desired product. Further, wire coating compositions produced from these blends are constantly being sought which possess the desired characteristics of good dielectric properties.

An object of this invention is to provide a foam extrusion composition containing a foam retarder which prevents premature decomposition of foaming agents in the blend.

Another object of the invention is to provide a foam retarder which retards the decomposition of foaming agents related to the concentration level of the retarder.

Another object of this invention is to provide a blend capable of being coated on a wire and thus producing a coated wire having good dielectric properties.

Other aspects, objects, and advantages of the present invention will be apparent from a study of the written disclosure and the appended claims.

According to the present invention we have now discovered foam retarders that are effective retarders for a foaming agent, azobisformamide, that can be incorporated into low density polyethylene to increase the stock temperature of the resin and prevent premature decomposition of the foaming agent. Further, we have found that a wire coated with the blend employing the retarder of the invention to produce a coated wire showed an excellent dielectric dissipation factor. By varying the concentration level of the retarder, the blend can be adjusted readily to the requirements of the equipment used in various foam extrusion operations, and the wire coating compositions can be produced having the desired dielectric dissipation factor when the blend of the present invention is used in the wire coating operation. Further, we have found that the variation in the concentration levels of the foaming agent is linearly related to the low density degree of retardation over the range of about 0.3 to 0.5 weight percent foaming agent and that the degree of retardation tapers off asymptotically about the 0.5 percent concentration.

The low density polyethylene used according to the present invention has a density between about 0.89–0.93 and can be prepared by methods well known in the art.

The foam retarders employed in the present invention can be represented by the general formula:

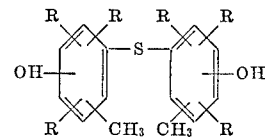

where R is H, $CH_3$, $C(CH_3)_3$ or a hydrocarbon radical selected from the group consisting of cycloalkyl, alkylcycloalkyl, cycloalkylalkyl, alkylarylalkyl, and aralkyl radicals having from 6 to 10 carbon atoms. The R substituents in the above formula can be the same or different hydrocarbon radicals, as defined above and their relative position is defined by the examples below.

Examples of suitable materials to be employed by the present invention and represented by the formula defined above include 2,2′-thiobis(6-cyclohexyl-p-cresol),
2,2′-thiobis(6-cyclohexyl-m-cresol),
2,2′-thiobis(6-methylcyclohexyl-p-cresol),
2,2′-thiobis(6-methylcyclohexyl-m-cresol),
2,2′-thiobis(6-propylcyclohexyl-p-cresol),
2,2′-thiobis(6-propylcyclohexyl-m-cresol),
2,2′-thiobis(6-benzyl-p-cresol),
2,2′-thiobis(6-benzyl-m-cresol),
2,2′-thiobis(6-[2-phenylethyl]-p-cresol),
2,2′-thiobis(6-[2-phenylethyl]-m-cresol),
2,2′-thiobis(6-[3-phenylpropyl]-p-cresol),
2,2′-thiobis(6-[3-phenylpropyl]-m-cresol),
2,2′-thiobis(6-alpha,alpha-dimethylbenzyl-p-cresol),
2,2′-thiobis(6-alpha,alpha-dimethylbenzyl-m-cresol),
2,2′-thiobis(6-[4-phenylbutyl]-p-cresol),
2,2′-thiobis(6-[4-phenylbutyl]-m-cresol),
2,2′-thiobis(6-[3-butylcyclohexyl]-p-cresol),
2,2′-thiobis(6-[3-butylcyclohexyl]-m-cresol),
2,2′-thiobis(6-[4-cyclohexylbutyl]-p-cresol),
2,2′-thiobis(6-[4-cyclohexylbutyl]-m-cresol),
2,2′-thiobis(6-[4-n-propylbenzyl]-p-cresol),
2,2′-thiobis(6-[4-n-propylbenzyl]-m-cresol),
3-benzyl-3′-cyclohexyl-2,2′-dihydroxy-5,5′-dimethyldiphenyl sulfide,
4,4′-thiobis(6-tert-butyl-m-cresol), and the like.

A dispersant, such as polyisobutylene, can be incorporated into the blend in an amount in the range of about 0.02 to 0.1 weight percent of polyisobutylene and a filler such as zinc oxide, titanium oxide, carbon black and the like can be incorporated into the blend in an amount within the range of about 0.5 to 5 weight percent filler. However, the dispersant and the filler are not necessary in order to obtain the desired results of the present invention. The foaming agent, which is well known in the art, is incorporated into the blend and the concentration of the foaming agent can vary over a wide range depending on the degree of foaming desired. It has been found that in order to obtain the desired results of the present invention the foaming agent employed is azobisformamide and the azobisformamide is present in the blend in an amount ranging from about 0.5 to 2 weight percent. While the retarders function with other blowing agents, such as p,p′-oxybisbenzenesulfonyl hydrazide and p-toluenesulfonyl semicarbazide the linear relation of concentration of retarder and control of the stock temperature of the blend is lacking.

The foam retarders of the invention can be employed in an amount ranging from about 0.03 to 0.5 weight percent retarder, preferably in an amount ranging from about 0.05 to 0.3 weight percent retarder. The foam retarders of the invention can be prepared by any method known in the art. One suitable method of preparing the retarders of the invention comprises reacting the corresponding alkylated p-cresol or m-cresol with sulfur dichloride in the ratio of 2 mols of the cresol compound to 1 mol of sulfur dichloride. However, it should be understood that other methods of preparing these materials can be advantageously employed. The effectiveness of the foam retarders of the invention is linearly related to the variation in concentration levels of the retarders over a range of about 0.03 to 0.5 weight percent foam retarders. For instance, tests conducted wherein 0.05, 0.1 and 0.2 weight percent of 4,4'-thiobis(6-tert-butyl-m-cresol) was added to the foaming composition as the retarder showed an increase in stock temperature of 5°, 10° and 20° F., respectively. The linearly related variation in concentration levels of the retarders of the invention is surprising in that other retarders generally function at an optimum level. Therefore, by controlling the amount of retarder of the present invention the stock temperature of the resin can likewise be readily controlled.

Further, blends produced employing the 4,4'-thiobis(6-tert-butyl-m-cresol) as a retarder when coated on a wire showed good dielectric dissipation factor. The addition of the retarder in the blend did not have adverse effects on the dielectric properties of the blend.

The following examples set forth specific embodiments of our invention but they are not intended to limit the invention but are for illustrative purposes only.

EXAMPLE I

Several runs were carried out in which a foam retarder of the invention was blended with low density polyethylene having a density of 0.917 and a melt index of 0.2. In each run 0.1 weight percent of polyisobutylene, having a molecular weight of approximately 1000, 0.5 weight percent zinc oxide, and 0.5 weight percent azobisformamide were admixed with the polyethylene on a drum tumbler at room temperature and then introduced into an extruder where the resulting resin was extruded. The conditions listed below are those employed to produce maximum foam and maximum uniformity with maximum capacitance.

In the four runs the amount of 4,4'-thiobis(6-tert-butyl-m-cresol), the foam retarder, was varied from the concentration of 0 in Run 1, the control run, to 0.05 weight percent, 0.1 weight percent, 0.2 weight percent and 0.3 weight percent in Runs 2, 3, 4 and 5, respectively. The temperatures in the heating zones of the extruder were gradually increased to obtain the maximum die temperature.

TABLE I

| Wt. percent of 4,4'-thiobis(6-tert-butyl-m-cresol) | Zone 1* | Zone 2* | Zone 3* | Zone 4* | Stock temp. | Die temp. | Head pressure (p.s.i.) |
|---|---|---|---|---|---|---|---|
| Run No.: | | | | | | | |
| 1 | 0 | 230 | 280 | 330 | 340 | 340 | 340 | 1,450 |
| 2 | 0.05 | 235 | 280 | 315 | 340 | 345 | 340 | 1,400 |
| 3 | 0.1 | 240 | 280 | 320 | 340 | 350 | 340 | 1,400 |
| 4 | 0.2 | 240 | 280 | 340 | 350 | 360 | 350 | 1,400 |
| 5 | 0.3 | 240 | 280 | 330 | 350 | 365 | 360 | 1,500 |

* Zone 1 is the zone nearest the inlet end of the extruder and zone 4 is the zone nearest the outlet end.

It is clearly evident that the addition of 4,4'-thiobis(6-tert-butyl-m-cresol) increased the stock temperature and the resulting temperature of the extrudate at the die face. The temperature of the extrudate at the die face increased linearly with the increase of concentration of the retarder.

EXAMPLE II

In order to determine the effect of the addition of 4,4'-thiobis(6-tert-butyl-m-cresol) to the resin compositions discussed above the compositions produced above were to coat copper wires and then the capacitance of the coated wires determined. The data below illustrate the wire coating variables employed in the present experiments as well as the capacitance of the coated wire.

TABLE II

| | Wt. percent of 4,4'-thiobis(6-tert-butyl-m-cresol) | Wire size | Wire speed (f.p.m.) | Coating thickness | Capacitance, picafaraday |
|---|---|---|---|---|---|
| Run No.: | | | | | |
| 1 | 0 | 19 | 83 | 58 | 40 |
| 2 | 0.1 | 19 | 98 | 58 | 40 |
| 3 | 0.2 | 19 | 91 | 59 | 40 |

It is clearly evident from the above data that the addition of 4,4'-thiobis(6-tert-butyl-m-cresol) to a low density polyethylene resin functions as a retarder in a foaming process thereby permitting higher stock temperatures to be employed and at the same time preventing premature decomposition of the foaming agent without sacrificing the dielectric properties of the resin.

Various modification and alterations of this invention will become apparent to those skilled in the art without departing from the scope and spirit of this invention, and it should be understood that this invention is not to be limited unduly to that set forth herein for illustrative purposes.

We claim:

1. A low density polyethylene resin composition having increased thermal stability comprising a retarder having the formula

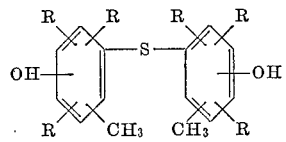

where R is H, $CH_3$, $C(CH_3)_3$ or a hydrocarbon radical selected from the group consisting of cycloalkyl, alkylcycloalkyl, cycloalkylalkyl, alkyl arylalkyl, and aralkyl radicals, said hydrocarbon radicals having 6–10 carbon atoms, polyethylene having a density of about 0.89–0.93 and azobisformamide.

2. The composition according to claim 1 wherein said retarder is present in the amount ranging from about 0.03 to 0.5 weight percent based on said resin.

3. The composition according to claim 2 wherein said retarder is present in the range of about 0.05 to 0.3 weight percent.

4. The composition according to claim 1 which includes a dispersing agent present in the amount of about 0.02 to 0.1 weight percent, a filler present in the range of about 0.5 to 5 weight percent, and said azobisformamide is present in the range of about 0.5 to 2 weight percent.

5. The composition according to claim 4 wherein said dispersing agent is polyisobutylene having a molecular weight of about 1000, said filler is zinc oxide.

6. The composition according to claim 1 wherein said retarder is 4,4'-thiobis(6-tert-butyl-m-cresol).

7. A process for increasing the thermal stability of a low density polyethylene having a density of about 0.89–0.93 comprising admixing said polyethylene with from 0.5 to 2 weight percent azobisformamide, and a foam retarder represented by the formula

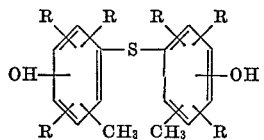

where R is H, $CH_3$, $C(CH_3)_3$ or a hydrocarbon radical selected from the group consisting of cycloalkyl, alkylcycloalkyl, cycloalkylalkyl, alkylarylalkyl, and aralkyl radicals, said radicals having 6–10 carbon atoms for a sufficient period to form a uniform blend having increased thermostability.

8. The process according to claim 7 which includes the steps of blending from about 0.5 to 2 weight percent of a dispersant and from about 0.5 to 5 weight percent of a filler to said blend.

9. The process according to claim 8 wherein said dispersant is polyisobutylene having a molecular weight of about 1000, said filler is zinc oxide.

10. The process according to claim 7 wherein said retarder is present in the range of about 0.05 to 0.3 weight percent.

11. The process according to claim 10 wherein said retarder is 4,4'-thiobis(6-tert-butyl-m-cresol).

References Cited
UNITED STATES PATENTS 2,985,617   5/1961   Salyer et al. _____ 260—45.7

MURRAY TILLMAN, Primary Examiner

WILBERT T. BRIGGS, Sr., Assistant Examiner

U.S. Cl. X.R.

117—128.4; 260—41, 45.95, 94.9; 264—54